US010313835B2

(12) United States Patent
Bakshi et al.

(10) Patent No.: US 10,313,835 B2
(45) Date of Patent: Jun. 4, 2019

(54) MOBILE DEVICE THAT GENERATES LOCATION-BASED ALERTS IN A POWER EFFICIENT MANNER

(71) Applicant: ZUMIGO, INC., San Jose, CA (US)

(72) Inventors: Chirag C. Bakshi, San Jose, CA (US); Harish Manepalli, San Jose, CA (US); Venkatarama Parimi, Dublin, CA (US)

(73) Assignee: ZUMIGO, INC., San Jose, CA (US)

( * ) Notice: Subject to any disclaimer, the term of this patent is extended or adjusted under 35 U.S.C. 154(b) by 0 days.

(21) Appl. No.: 15/942,166

(22) Filed: Mar. 30, 2018

(65) Prior Publication Data
US 2018/0288570 A1 Oct. 4, 2018

Related U.S. Application Data

(60) Provisional application No. 62/479,947, filed on Mar. 31, 2017.

(51) Int. Cl.
G08B 1/08 (2006.01)
H04W 4/02 (2018.01)
G06F 8/61 (2018.01)
H04W 4/50 (2018.01)
G08B 25/10 (2006.01)
(Continued)

(52) U.S. Cl.
CPC .............. *H04W 4/023* (2013.01); *G06F 8/61* (2013.01); *G08B 25/10* (2013.01); *H04L 67/20* (2013.01); *H04W 4/021* (2013.01); *H04W 4/50* (2018.02); *H04W 52/0251* (2013.01); *Y02D 70/00* (2018.01); *Y02D 70/142* (2018.01);
(Continued)

(58) Field of Classification Search
CPC ... H04W 4/023; H04W 4/50; H04W 52/0251; H04W 4/021; G06F 8/61; H04L 67/20; G08B 25/10; Y02D 70/164; Y02D 70/20; Y02D 70/00; Y02D 70/26; Y02D 70/142
USPC ... 340/539.13, 573.4, 539.1, 539.11, 539.16, 340/573.1
See application file for complete search history.

(56) References Cited

U.S. PATENT DOCUMENTS 8,831,627 B2 * 9/2014 Aninye ............... B60R 25/1004
340/539.11
2005/0068169 A1 * 3/2005 Copley .............. G08B 21/0283
340/539.13
(Continued)

FOREIGN PATENT DOCUMENTS

KR 20070083015 A 8/2007

OTHER PUBLICATIONS

PCT International Search Report dated Jul. 31, 2018, filed in counterpart PCT International Patent Application No. PCT/US2018/025581 (14 pages).

*Primary Examiner* — Anh V La
(74) *Attorney, Agent, or Firm* — Kim & Stewart LLP

(57) ABSTRACT

A mobile device includes a storage device in which an application software of a third party service provider and rules associated with the application software are stored, a network interface, a sensor configured to detect a location of the mobile device, and a processor configured to generate a location alert to be transmitted through the network interface according to the rules. The mobile device implements the rules for location-based alerts therein such that the frequency of the alerts is carefully controlled and the power supply of the mobile device is efficiently utilized.

20 Claims, 4 Drawing Sheets

(51) Int. Cl.
   *H04L 29/08* (2006.01)
   *H04W 4/021* (2018.01)
   *H04W 52/02* (2009.01)

(52) U.S. Cl.
   CPC ............ *Y02D 70/164* (2018.01); *Y02D 70/20* (2018.01); *Y02D 70/26* (2018.01)

(56) References Cited

U.S. PATENT DOCUMENTS

| | | |
|---|---|---|
| 2011/0063138 A1 | 3/2011 | Berkobin et al. |
| 2015/0189473 A1 | 7/2015 | Makris et al. |
| 2015/0350825 A1 | 12/2015 | Kim et al. |
| 2016/0027292 A1* | 1/2016 | Kerning .................. H04W 4/90 455/404.2 |
| 2016/0066145 A1 | 3/2016 | Pietraniec |
| 2016/0110987 A1* | 4/2016 | Hughes .................. G08B 21/22 340/573.4 |
| 2016/0132310 A1* | 5/2016 | Koushik .................... G06F 8/61 717/176 |
| 2018/0206067 A1 | 7/2018 | Kim et al. |

\* cited by examiner

MOBILE DEVICE THAT GENERATES LOCATION-BASED ALERTS IN A POWER EFFICIENT MANNER

CROSS-REFERENCE TO RELATED APPLICATION

This application claims benefit of U.S. Provisional Patent Application Ser. No. 62/479,947, filed Mar. 31, 2017, which is herein incorporated by reference in its entirety.

BACKGROUND

A location-based service (LBS) has been used by many service providers, for example, in information, security, telecommunication, transportation, marketing, and entertainment industries, to provide services in a more timely, accurate, efficient, and/or targeted manner. LBS has been used to identify a location of a cardholder of a payment card for an issuing bank service provider to more easily detect and prevent fraudulent transactions associated with the payment card, based on the current location of the cardholder. LBS has also been used to discover the nearest stores or ATM machines for a service provider to provide more relevant and/or timely recommendations. In addition, LBS may be used in parcel tracking and vehicle tracking services.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
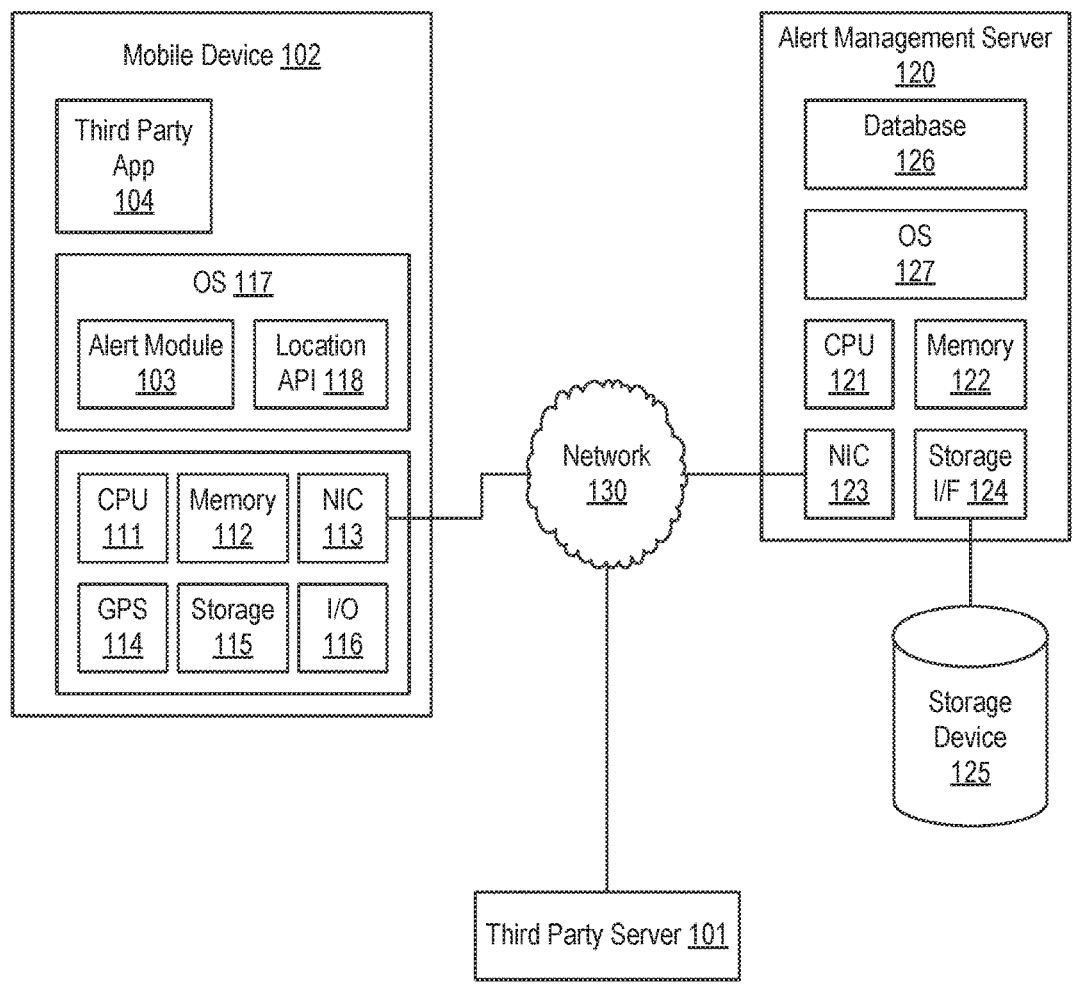
FIG. 1 is a block diagram of a location-based alert system according to embodiments.

A mobile device, according to an embodiment, includes a storage device in which an application software of a third party service provider and rules associated with the application software are stored. The mobile device further includes a network interface, a sensor configured to detect a location of the mobile device, and a processor configured to generate a location alert to be transmitted through the network interface according to the rules.

The rules are defined by the third party service provider and received through the network interface during installation of the application software in the mobile device. The mobile device receives the rules from an alert management server and transmits the location alert to the alert management server independently of execution of the application software, and communicates with a server of the third party service provider during the execution of the application software.

During installation of the application software in the mobile device, the processor generates a token that is unique to the mobile device and transmits the token to the alert management server. Alternatively, during installation of the application software in the mobile device, the processor receives a token that is unique to the mobile device from the alert management server.

The processor is programmed to execute an operating system and an alert module of the operating system determines the location of the mobile device based on outputs from the sensor. In addition, the alert module generates the location alert according to the rules for transmission through the network interface. According to one example, the rules define a geo-fence boundary, and the alert module generates the location alert when the mobile device travels across the geo-fence boundary. According to another example, the rules define a maximum time, and the alert module generates the location alert when a time elapsed since a last location alert transmitted to the alert management server exceeds the maximum time. According to yet another example, the rules define a maximum distance, and the alert module generates the location alert when a distance between the location of the mobile device and a location of the mobile device of a last location check exceeds the maximum distance.

A mobile device location monitoring system, according an embodiment, includes a mobile device in which an application software of a third party service provider is installed, and an alert management server that manages location monitoring rules for the third party service provider and transmits the location monitoring rules to the mobile device. The mobile device is configured to generate a location alert to be transmitted to the alert management server according to the location monitoring rules, and the alert management server is configured to notify the third party service provider of the location alert.

The location monitoring rules are defined by the third party service provider. The mobile device receives the location monitoring rules from an alert management server and transmits the location alert to the alert management server independently of execution of the application software, and communicates with a server of the third party service provider during the execution of the application software.

During installation of the application software in the mobile device, the mobile device generates a token that is unique to the mobile device and transmits the token to the alert management server. Alternatively, during installation of the application software in the mobile device, the mobile device receives a token that is unique to the mobile device from the alert management server.

The mobile device includes a sensor and is programmed with an operating system, and an alert module of the operating system determines the location of the mobile device based on outputs from the sensor. In addition, the alert module generates the location alert according to the location monitoring rules. According to one example, the location monitoring rules define a geo-fence boundary, and the alert module generates the location alert when the mobile device travels across the geo-fence boundary. According to another example, the location monitoring rules define a maximum time, and the alert module generates the location alert when a time elapsed since a last location alert transmitted to the alert management server exceeds the maximum time. According to yet another example, the location monitoring rules define a maximum distance, and the alert module generates the location alert when a distance between the location of the mobile device and a location of the mobile device of a last location check exceeds the maximum distance.

Systems and methods are described herein for monitoring the location of a mobile device (e.g., smart phone, tablet, etc.) and triggering location-based alerts and time-based alerts. More specifically, the systems and method described herein include: the mobile device with the mobile device user's consent to release the data associated with the mobile device for location monitoring; a "geo-fence" surrounding "common locations," where the mobile device user spends a significant amount of time, and/or visits frequently (e.g., home, work, school, etc.), and/or frequently makes purchases; and an alert trigger (e.g., when the mobile device exits and/or enters the geo-fence). The term "geo-fence", as used herein, refers generally to a defined geographic region. A geo-fence can be defined by reference to a perimeter, or boundary, surrounding a geographic area. The geographic area may be substantially circular, substantially polygonal, or any other shape.

The term "region," "area," "location," or "geolocation," as used herein, refers generally to location of the mobile device, obtained, typically in three different ways: global positioning systems (GPS), cell tower triangulation and via Wi-Fi hotspots. In one or more embodiments, the location data of the mobile device may contain GPS coordinates, street address, an IP address, geo-stamps on digital photographs, smartphone check-in or other data, and other location data provided as a result, for example, of telecommunications or an online activity of the mobile device user. In still one or more embodiments, the location of the mobile device may be determined using techniques described in U.S. patent application Ser. No. 13/493,923, filed Jun. 11, 2012, the entire contents of which are incorporated by reference herein.

In one example according to one or more embodiments, a mobile device is configured to generate location-based alerts and transmitted to a third party service provider from whom the mobile device user is receiving services. The location-based alerts are transmitted to the third party service provider, through the alert management server, in accordance with rules for triggering location-based triggers (also referred to as location monitoring rules), as defined by the third party service provider. A third party "service provider" may include a payment service provider and a commerce service provider, which may benefit from monitoring the location of the mobile device user. As one example, a third party service provider may be an issuing bank that maintains one or more payment accounts for the mobile device user and issues a payment card or other payment device (e.g., a digital wallet) to the mobile device user. An alert may be sent to the issuing bank service provider when the mobile device user exits a pre-defined geo-fence, notifying the bank of possible fraudulent transactions. As another example, a third party service provider may be a recommendation service provider, such as Yelp®. An alert may be sent to the recommendation service provider when the mobile device user exits a pre-defined geo-fence, as a notification to the service provider that the mobile device user may be less familiar with activities, events, places, etc., outside of the geo-fence, and would benefit from location-based recommendations. A third party service provider may be a content service provider, such as an advertiser. An alert may be sent to the content service provider when the mobile device user enters a pre-defined geo-fence, as notification that the mobile device user is in position to receive contents related to locations within the geo-fence (e.g., advertisements for stores located within the geo-fence). These examples are non-limiting and are provided for illustration only.

The alert management server connects mobile devices and multiple third party servers, and serves the following functions: (i) a central repository of rules from the multiple third party servers, (ii) a management of communications with mobile devices such that the third parties are alleviated of this burden, (iii) a buffer of requests received from mobile devices for retransmission (e.g., when a third party sever is offline.), (iv) a reverse geocoder for converting latitude-longitude coordinates received from mobile devices into physical addresses, including the ability to flag country changes (e.g., filtering forwarding location alerts based on the country), and (v) a central repository for all events which can be analyzed for billing, reporting, etc.

In the example according to one or more embodiments, the third party service provider provides and maintains application software ("mobile app") to be installed on the mobile device. Such mobile apps include a mobile banking app (e.g., providing financial transactions remotely), a mobile recommendation app (e.g., providing recommendations for activity, event, restaurant, etc.), a mobile shopping app, and/or any other mobile app.

Systems and methods for monitoring the location of a mobile device described herein use an alert module on the mobile device. In the example according to one or more embodiments, the alert module is embodied as an operating system add-on software on the mobile device, and the function of the alert module is further described below in conjunction with FIGS. 1-4.

The user initiates the mobile app by signing up for a location alert service provided by the third party service provider and obtains sign-in credentials. As described above, the mobile app may provide the mobile device user with other features, services, and functions associated with the service provider (e.g., mobile banking services where the service provider is a bank, discount or recommendation services where the service provider is a recommendation engine such as Yelp®, etc.). The mobile device user may be required to sign up for the location alert service one-time, or every time the app is used. In the example according to one or more embodiments, the mobile device user logs into the mobile app using login credentials (and/or registration credentials) specific to the mobile app and/or the services of the service provider. In some cases, the mobile device user may need to register if the mobile device user is accessing the mobile app for the first time. In one or more embodiments, the mobile app may offer integrated login options that permit the mobile device user to log into the mobile app by "piggybacking" onto the login credentials of another app (e.g., "Sign-in using Facebook®"). The third party service provider is responsible for verifying and/or validating the login credentials (and/or registration credentials) specific to the mobile app and/or the services of the third party service provider. In the example according to one or more embodiments, a credential verification service is integrated within the mobile app.

The mobile device app captures the mobile device user's consent to release the location data associated with the mobile device for collection by the location alert service, on a consent request screen or dialog on the mobile device. The consent request screen describes data collection and/or location monitoring features as well as data protections (e.g., anonymization, encryption, aggregation, temporary or limited storage, etc.) offered by the location alert service. The mobile device user has the option to consent (i.e., agree to the data collection and/or location monitoring) or to withhold consent (i.e., deny the data collection and/or location monitoring and not participate in or receive the location alert service). As described further herein, if the mobile device user withholds consent to release the data, the alert module is deactivated such that the data associated with the mobile device is not monitored by the alert module via the mobile app. If the mobile device user consents to release the data for data collection and/or location monitoring, the login process proceeds as follows.

The mobile app prompts the mobile device user to enter one or more "common locations" for the mobile device user. The alert module may cause the mobile app to provide one or more input methods for the mobile device user to enter common locations. As one example, the mobile app may provide a text entry field for physical addresses of common locations, such as street addresses, ZIP codes, and/or ZIP+4 codes. As another example, the mobile app may provide an interactive map to the mobile device user, such that the mobile device user may select (e.g., tap, circle, etc.) one or more common locations on the map. The mobile app, under direction from the alert module, may permit the mobile device user to enter any number of common locations, or may restrict the number of commons locations. The alert module may further cause the mobile app to request contextualization of each of the common locations. "Contextualization" refers to further identification of the nature of the common locations, such as "home," "work," "school," etc. For example, the mobile app may provide a drop-down menu with a list of contextualizations from which the mobile device user may select for a common location. Contextualizations may also include date/time contextualizations of when the selected common location is a current common location of interest. For example, a common location contextualized as "school" may be further contextualized for Monday through Friday and August through June. As described further herein, the contextualizations may assist the alert module in defining appropriate geo-fences around each common location at a given time. The common locations entered by and/or selected by the mobile device user (as well as any associated contextualization) are stored by the alert module in a memory accessible to the alert module.

In one or more embodiments, the alert module may receive additional and/or alternative common locations, contextualizations, and/or other geo-fencing parameters (described further herein) from, for example, the third party service provider via the alert management server. For example, an issuing bank service provider may identify a common location (and/or other geo-fencing parameters) based on a frequency of transactions initiated by the mobile device user at a particular location or merchant, and/or within a particular distance range (e.g., within a one-mile radius).

Before, during, or after entering the common locations, the alert module is configured to register the mobile device user's consent to release the data for data collection and/or location monitoring by the location alert service. Upon receiving a notification of the mobile device user's consent (or denial of consent) from the mobile app, the alert module transmits a notification of the same to the alert management server. In the example according to one or more embodiments, if the notification indicates the mobile device user's denial of consent, the alert management server transmits a deactivation signal to the alert module, to cause the alert module to deactivate any data collection and/or location monitoring functions. If the notification indicates the mobile device user's consent, the alert management server transmits an activation signal to the alert module, to cause the alert module to activate and initiate data collection and/or location monitoring functions.

The alert module is configured to generate an identifier of the mobile device. The identifier of the mobile device may be a unique alphanumeric token specific to the mobile app on the mobile device, and may be referred to herein as being "associated with" the mobile device. Each installation of the mobile app on a mobile device is associated with a different unique token. Thus, for example, if a mobile device user were to sign up for the location alert system using two mobile devices, the two mobile devices would be associated with two different unique tokens, respectively. Further, in one or more embodiments, if a mobile device user were to un-install the mobile app and subsequently re-install the mobile app on the same mobile device, a new unique token would be generated by the alert module for the new installation of the mobile app. A unique token, in the example according to one or more embodiments, may be generated randomly or pseudo randomly, without referencing to any pre-existing hardware or software on the mobile device, or a mobile phone number of the mobile device (when the mobile device is a smartphone). Accordingly, the unique token does not identify any personally identifiable information (PII) associated the mobile device, other than the data collected for the location alert service, for data security purposes. Moreover, a unique token may be generated for mobile devices other than mobile phones, such as tablets, wearable computing devices (e.g., smart watches), and/or laptop computers, which may not have a mobile phone number, as a mobile phone number is not required to generate a unique token.

The alert module provides the unique token to the mobile app for transmittal to and/or access by the third party service provider. The third party service provider may store and/or otherwise process the unique token as necessary or desired. For example, an issuing bank service provider may associate the unique token with one or more payment accounts and/or payment methods associated with the mobile device user (e.g., in a lookup table).

In the example according to one or more embodiments, the third party service provider transmits the unique token to the alert management server. The third party service provider may further provide one or more rules defining trigger parameters associated with the mobile app stored in the mobile device. The trigger parameters define the alert trigger, or when a location alert is to be generated by the alert module and transmitted to the alert management server. Trigger parameters may be different for each mobile device user based on preferences of the third party service provider. As one example, an issuing bank service provider may provide a rule requiring a reduced-radius geo-fence for a higher risk user, to trigger location alerts more often and/or under more circumstances. As another example, a third party service provider (e.g., an issuing bank service provider or a recommendation service provider) may identify the mobile device user as an "urban user" that is unlikely to own a vehicle, likely to use public transportation, and/or likely to remain within a particularly small geo-fence. The third party service provider may thus provide a rule reducing the user's geo-fence. Other rules may define time-based trigger parameters (e.g., requiring periodic location alerts at particular time intervals), calendar-based trigger parameters (e.g., days of the week or holidays), location-based trigger parameters (e.g., different parameters for a geo-fence contextualized as "home" versus a geo-fence contextualized as "work") and/or any other trigger parameters.

In one or more embodiments, the third party service provider defines user-based rules (e.g., based on risk levels, demographics, travel frequency, and/or any other characteristic shared by groups of users). The third party service provider may transmit new, updated, amended, and/or alternative rules to the alert management server at any time. For example, an issuing bank service provider is unsatisfied with the amount of alerts being triggered for a mobile device (e.g., there are too many or too few alerts), the third party service provider may define a new rule to be applied to the alert trigger of the mobile device such that a more appropriate or desired number of alerts may be triggered. Moreover, the third party service provider may transmit such new, updated, amended, and/or alternative rules to be applied to a plurality of mobile devices at once (e.g., identifying a batch of unique tokens associated with one new rule). The alert management server may then transmit such rules via individual messages or signals to each mobile device identified by the third party service provider. In one or more embodiments, other parties (e.g., the mobile device user, an advertiser or other content provider) may provide other rules.

In one or more embodiments, the alert module transmits the unique token to the alert management server via the same signal or message as the notification of consent, to notify the mobile device to be activated/deactivated. The alert management server transmits any rules (e.g., provided by the third party service provider) to the alert module. The alert management server may transmit the rules via the same signal or message as the activation signal, to minimize the data and processing bandwidth utilized by the location alert system. In one or more embodiments, the activation signal activates the alert module to initiate the location monitoring under the triggering parameters defined by the rules. When no rules are transmitted (e.g., the third party service provider provided no rules and/or the activation signal is transmitted to the alert module prior to transmission of the rules) and/or rules are transmitted that do not define one or more triggering parameters, the alert module may access pre-determined triggering parameters.

Once the alert module is activated, the alert module establishes a geo-fence appropriate for and specific to the mobile device user, based on the entered/selected common locations and the rules from the third party service provider. In one or more embodiments, the alert module establishes the geo-fence as a certain radius (e.g., X miles) around a common location (e.g., a street address or selected point/coordinate) entered by the mobile device user and/or defined by the third party service provider, where the radius X may be designated in a rule from the third party service provider and/or may have a pre-determined value. In one or more embodiments, the alert module is configured to designate a center point of a common location (e.g., a center point of an input zip code) and apply the radius from the center point. In one or more embodiments, the mobile device user may specify the geo-fence by drawing a perimeter on a map displayed by the mobile app. The alert module may accept the mobile device user's entry as the defined geo-fence. Alternatively, the alert module may expand, contract, adjust, and/or normalize the entered geo-fence (e.g., adjust an irregular shape into a circular or elliptical boundary).

The alert module also defines one or more trigger conditions. When a "trigger condition" is met, the alert module generates and transmits an alert. A trigger condition may be defined based on a rule (e.g., a trigger parameter) from the third party service provider, or based on pre-defined trigger parameters. Trigger conditions may be time- and/or location-based. The alert module passively monitors the operating system of the mobile device for one or more trigger conditions. For example, one rule from the third party service provider may define a periodic time interval at which the third party service provider desires an alert to be generated at a minimum, such as every 20 minutes or every hour. Accordingly, the alert module monitors the mobile device's internal clock function. When the alert module detects that a time interval (e.g., 20 minutes or one hour) has expired, the alert module generates and transmits an alert. As another example, a rule from the third party service provider may identify the desired radius to define the geo-fence boundary (described above) as five miles. The alert module establishes the geo-fence boundary accordingly, and monitors a current location of the mobile device (e.g., the GPS coordinates of the mobile device, output form a GPS sensor, described further herein), which are accessed through an application programming interface (API) provided by the operating system of the mobile device. "Current location" refers to the sensed and/or determined geolocation of the mobile device at the time and the location is output from the API of the mobile device. The alert module compares the current location of the mobile device to the defined geo-fence boundary. When the alert module detects that the mobile device has crossed the geo-fence boundary, the alert module generates and transmits an alert.

In the example according to one or more embodiments, the alert module generates the alert for transmission to the alert management server. The alert includes the unique token associated with the mobile device. The alert also includes the current location of the mobile device at the time the alert is triggered (i.e., the trigger condition is detected). In one or more embodiments, the current location of the mobile device is described using GPS coordinates, or latitude-longitude coordinates. Precision of the coordinates is determined by precision of a GPS sensor of the mobile device (e.g., several decimal points). Moreover, the current location of the mobile device may be described using a physical address. For example, the alert module maps the current location of the mobile device to a physical, street address (e.g., using mapping functionality available to the mobile device or an external reverse geocoding tool). The alert may also include a time/date stamp identifying the time the alert was triggered. In some cases, the alert may identify the nature of the trigger condition. For example, the alert may identify an alert triggered by expiration of a periodic time interval as a time-based alert, and an alert triggered by deviation from the geo-fence boundary as a location-based alert. The alert module transmits the alert to the alert management server (e.g., in an alert signal).

The alert management server is configured to determine which third party service provider requested received alerts. For example, the alert management server may maintain a lookup table mapping the unique token to the mobile device as well as to any service providers that have requested to receive alerts associated with the mobile device. In one or more embodiments, the alert management server does not transmit every alert to the third party service provider, but rather only transmits a certain subset of the received alerts. For example, the third party service provider may wish to only receive alerts related to "high-risk" users, or only receive a certain percentage of alerts, or only receive alerts under certain conditions. The third party service provider defines conditions or rules under which the alert management server is to transmit alert to the third party service provider. The alert management server stores these conditions or rules, and, for each alert received from the alert module that is associated with (i.e., was triggered according to rules defined by) the third party service provider, the alert management server determines whether to transmit the alert to the third party service provider based on the stored conditions or rules.

The third party service provider may store, process, and/or otherwise handle the received alert. In one or more embodiments, the third party service provider maintains a lookup table mapping the unique token to any relevant other details (e.g., mobile device ID such as an IP address or phone number, user profiles, payment accounts, etc.). In this way, the alert management server need not ever access any personal information associated with the mobile device user and/or user accounts with the third party service provider. Nor does the alert module or the alert management server transmit any personally identifiable information, as the unique token does not identify the device or the mobile device user outside of the context of the location alert system.

In one or more embodiments, the alert management server may perform one or more processes using the information in the alert on behalf of the third party service provider. For example, the alert management server may perform certain fraud scoring processes using received alerts on behalf of an issuing bank service provider.

Described herein is an example implementation of generating location-based mobile device alerts according to one or more embodiments. In this example implementation, the third party service provider is an issuing bank. The issuing bank service provider maintains a payment account associated with a mobile device user and has issued to the mobile device user a payment device (e.g., a payment card) to the mobile device user. The issuing bank service provider contracts with the location alert system to provide location-based alerts associated with the mobile device user for fraud prevention purposes. The issuing bank service provider maintains a mobile banking app that is downloaded and installed on the mobile device. The mobile device user updates the mobile app, which downloads and installs the alert module on the mobile device. The next time the mobile device user accesses the mobile banking app, a consent request screen is displayed. The mobile device user consents to release location data for data collection and/or location monitoring. The mobile banking app, under direction from the alert module, displays an input screen to the mobile device user, requesting that the mobile device user enter a common location. The mobile device user selects a point on an interactive map corresponding to the mobile device user's home location and selects a "Home" option from a drop-down contextualization menu.

The alert module generates a unique token associated with the mobile device and transmits the unique token to the issuing bank service provider via the mobile banking app. The issuing bank service provider stores the unique token in a lookup table, associating the unique token with an account number of the mobile device user's payment account and a card number of the mobile device user's payment card. Based on a risk level associated with the mobile device user (e.g., based on past transactional behavior), the issuing bank service provider generates a first rule and a second rule. The first rule indicates a radius of the geo-fence boundary of 25 miles. The second rule indicates a periodic time interval of one hour. The issuing bank service provider transmits a message to the alert management server including the unique token and the first and second rules.

The alert module also transmits the unique token to the alert management server along with a notification that the mobile device user has given their consent to location monitoring. The alert management server generates and transmits an activation signal to the alert module, which causes the alert module to activate to begin location monitoring via the location systems of the mobile device's operating system. The alert management server also transmits the first and second rules to the alert module. Accordingly, the alert module defines a geo-fence boundary with a radius of 25 miles around the mobile device user's home location. The alert module also defines two trigger conditions: the expiration of one hour, based on the mobile device's clock functions, and a current location outside of the geo-fence boundary. The alert module monitors the mobile device for either trigger condition. When either trigger condition is met, the alert module generates an alert including the unique token associated with the mobile device and the latitude-longitude coordinates of the mobile device. The alert module transmits the alert to the alert management server.

The alert management server identifies the issuing bank service provider as the source that requested the alerts for the mobile device. The alert management server then forwards the alert to the issuing bank service provider. The issuing bank service provider receives the alert and uses the unique token to identify the mobile device user and the related payment account and payment card. The issuing bank service provider records the location of the mobile device at the time of the alert. Accordingly, the next time the mobile device user initiates a transaction using the payment card, the issuing bank service provider will access the last known location of the mobile device and include such information in its fraud modeling to determine whether to authorize or decline the transaction.

Systems and methods for monitoring the location of a mobile device according to one or more embodiments of the claimed invention (a) improve accuracy of location tracking of mobile device using internal GPS sensors, (b) reduce data storage and processing (e.g., bandwidth) requirements required for unnecessary alerts by location alerts tailored to specific users to optimize the frequency of generating location alerts, (c) reduce or eliminate dependence on mobile network operators to determine mobile device location, (d) reduce the likelihood that fraudulent payment card transactions will be approved, thereby reducing network bandwidth, time, and resources required to correct such fraudulent transactions; and (e) allow efficient use of the mobile device's power supply by carefully controlling the frequency of the location alerts.

As used herein, a processor may include any programmable system including systems using microcontrollers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one or more embodiments, a computer program is provided, and the program is embodied on a computer readable medium. In an example according to one or more embodiments, the system is executed on a single computer system, without requiring a connection to a sever computer. In one or more embodiments, the system is being run in a Windows® environment (Windows is a registered trademark of Microsoft Corporation, Redmond, Wash.). In one or more embodiments, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a block diagram of a location-based alert system (hereinafter the "alert system") according to embodiments. The alert system is managed centrally by an alert management server 120 for service providers. FIG. 1 also illustrates a server of the third party (also referred to as a third party server) 101, which is managed by one of the third party service providers, and mobile device 102 of a user who has installed a third party app 104 in mobile device 102 to access services provided through third party server 101. Although only one third party server 101 and mobile device 102 are illustrated, it should be understood that location alert system 100 may include any number of third party servers like third party server 101, which are managed by different service providers, and multiple mobile devices like mobile device 102, which belong to different users.

Alert management server 120 maintains information about the different users and their mobile devices and the third party applications serviced by the different third party servers using a database application (referred to herein as "database 126"), running on top of the server's operating system (OS) 127. In particular, database 126 stores unique tokens, lookup tables mapping unique tokens to different mobile devices, different third party servers, and received alerts, and/or any other information used by the alert system, as described herein.

Hardware platform of alert management server 120 includes one or more central processing units (CPU) 121, system memory 122, one or more network interface controllers (NIC) 123, and a storage interface (e.g., host bus adapter) 124 through which database 126 performs input/output operations to storage device 125 to persistently store the data managed thereby. Alert management server 120 communicates with mobile device 102 and third party server 101 over network 130 through NIC 123.

Mobile device 102 also includes NIC 113 through which mobile device 102 communicates with alert management server 120 and third party server 101. In addition to NIC 123, the hardware platform of mobile device 102 includes CPU 111, system memory 112, a global positioning system sensor (GPS) 114, a local storage device 115, and an input/output device (I/O) 116, such as a touch panel. As shown in FIG. 1, mobile device 102 also includes an OS 117 which two modules, an alert module 103 and a location system module 118. The functions of alert module 103 and location system module 118 will be described below in conjunction with flow diagrams of FIGS. 2-4.

OS 117 provides a location API which determines the location of mobile device 102. In one embodiment, the location API employs GPS 114 to determine the location of mobile device 102. In other embodiments, the location API employs a variety of different techniques (GPS, WIFI SSIDs, Cell Tower, etc.) employing one or more additional sensors, such as an accelerometer, gyroscope, etc., to determine the location of mobile device 102. In the example illustrated below in conjunction with FIGS. 2-4, it is assumed that the location API employs the parameters, maximum time, maximum distance, and exit from/entry to a designated geo-fence, in determining when to deliver location information to the requesting application (e.g., third party app 104).

In the example embodiment, mobile device 102 include any mobile computing device capable of interconnecting to the Internet including a web-based phone, also referred to as smart phone, personal digital assistant (PDA), tablets, laptop computers, wearable computing devices such as "smart watches" or personal projection devices, or other web-based connectable equipment. Mobile device 102 may be in communication with a geopositioning network to facilitate GPS functionality of mobile device 102.

Alert management server 120 receives rules defining trigger parameters from third party server 101 and transmits those rules (e.g., along with an activation signal) to alert module 103. In addition, alert management server 120 receives alerts from alert module 103 and transmits the alerts to third party server 101 for further processing and/or storage. Communication between these components is facilitated over network 130.

Figure 2:
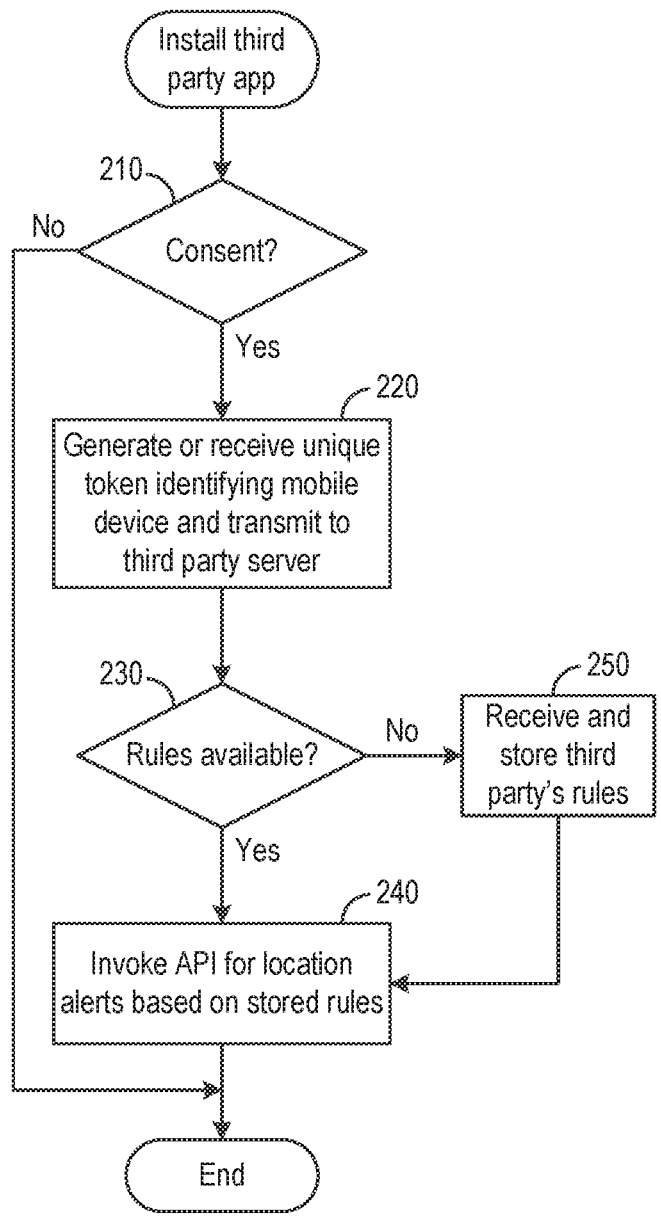
FIG. 2 is a flow diagram of method steps for enabling location-based triggers in a mobile device according to embodiments.

FIG. 2 is a flow diagram of method steps for enabling location-based triggers in a mobile device according to embodiments. The method steps in FIG. 2 are triggered when a user installs a third party app, e.g., third party app 104 which is serviced by third party server 101. Upon installation, at step 210, alert module 103 prompts the mobile device user for consent for third party app 104 to perform location monitoring. A refusal by the mobile device user (step 210, no) terminates the process. If the mobile device user consents (step 210, yes), alert module 103 proceeds to step 220.

At step 220, alert module 103 of mobile device 102 generates a unique alphanumeric token specific to mobile device 102. The unique token functions as a (unique) identifier of mobile device 102. In one or more embodiments, alert management server 120 may remotely generate the unique token and transmit the unique token to mobile device 102. Upon generating the unique token or receiving the unique token from alert management server 120, alert module 103 transmits the unique token to alert management server 120, and alert management server 120 associates the unique token to mobile device 102 (e.g., phone number of mobile device 102), and third party app 104. Thus, when location alerts are generated by mobile device 102 and transmitted to alert management server 120 along with this token, alert management server 120 transmits any necessary warnings to third party server 101.

At step 230, alert module 103 determines whether the third party's rules for triggering location alerts are stored in mobile device 102. In one or more embodiments, the rule may specify the following: (1) report exits from and entries into geo-fence which is set at user's home address with a radius of 25 miles; (2) report location every 12 hours; and (3) report location if distance traveled exceeds 50 miles. Instead of the mobile device user's home address, the geo-fence may be set with any of the mobile device user's common locations at its center. "Common locations" refer to locations where the mobile device user spends a significant amount of time, visits frequently, and/or frequently makes purchases (e.g., in the situations in which third party server 101 is an issuing bank and is interested in fraud prevention). In one or more embodiments, alert module 103 causes third party app 104 to provide one or more input methods for the mobile device user to input the common locations. In one or more embodiments, third party server 101 may customize the rules based on risk levels, demographics, travel frequency, and/or any other characteristic shared by groups of users.

If the rules are stored in mobile device 102 (step 230, yes), alert module 103 proceeds to step 240. If the rules stored in mobile device 102 are not updated (step 230, no), at step 250, third party server 101 transmits new, updated, amended, and/or alternative rules to mobile device 102 as part of an update to third party app 104, and alert module 103 updates the rules stored in mobile device 102 accordingly.

At step 240, alert module 103 invokes the location API with the parameters of the API set using the stored rules, i.e., maximum time=12 hours, maximum distance=50 miles, and geo-fence is defined by a radius of 25 miles with the mobile device user's home address set as the center. After step 240, the process ends.

Figure 3:
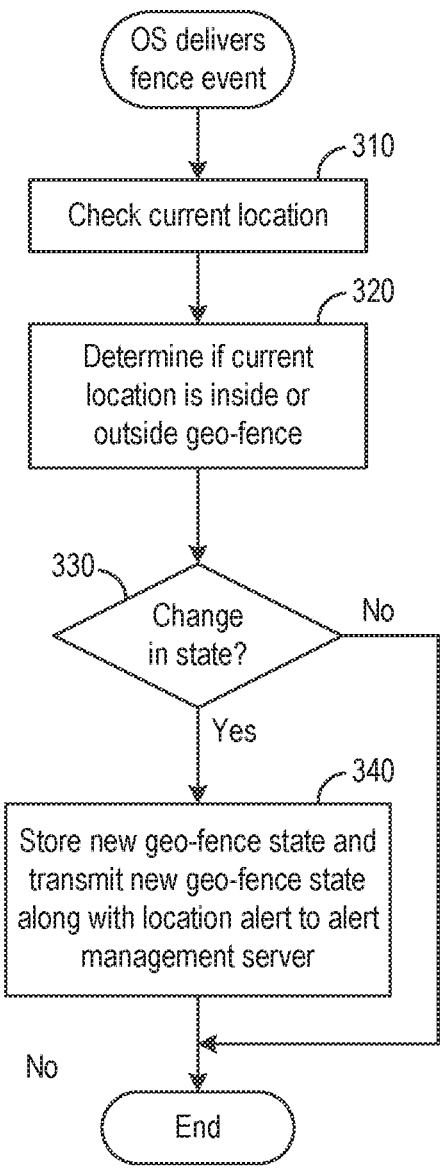
FIG. 3 is a flow diagram of a first example of a method for generating location-based alerts according to embodiments.

FIG. 3 is a flow diagram of a first example of a method for generating location-based alerts according to embodiments. In this first example, OS 117 generates a geo-fence entry event when it detects that the mobile device user has entered the geo-fence or a geo-fence exit event when it detects that the mobile device user has exited the geo-fence. In response to either event, alert module 103 performs the steps illustrated in FIG. 3.

At step 310, alert module 103 checks the current location, e.g., by invoking an API that returns the current location. Then, based on the current location returned by the API, alert module 103 at step 320 determines if the mobile device user is inside or outside the geo-fence. If there no change in state as determined at step 330 (user remained inside or outside the geo-fence since the last determination), the process ends. On the other hand, if there is a change in state as determined at step 330 (user traveled across the geo-fence boundary and moved inside or outside the geo-fence since the last determination), step 340 is executed, where alert module stores the mobile device user's new geo-fence state (inside or outside) in storage device 115 and transmits the new geo-fence state as a location alert to alert management server 120.

The location alert includes the unique token associated with mobile device 102, to identify mobile device 102 to which the alert is related. The location alert also includes the current location of mobile device 102 at the time the location alert is triggered. The location alert also includes a time/date stamp identifying the time the alert was triggered. The location alert also identifies the nature of the trigger condition, e.g., geo-fence entry or geo-fence exit.

Figure 4:
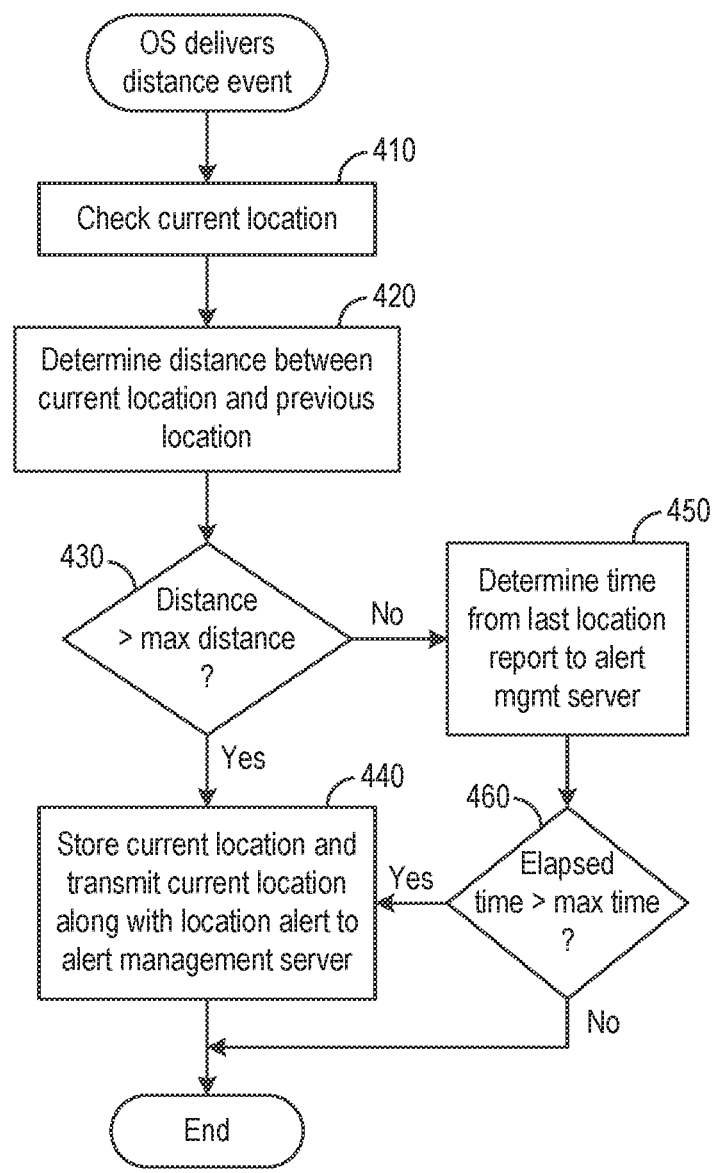
FIG. 4 is a flow diagram of a second example of a method for generating location-based alerts according to embodiments.

FIG. 4 is a flow diagram of a second example of a method for generating location-based alerts according to embodiments. In this second example, OS 117 generates a distance event when it detects that the distance traveled by the mobile device user exceeds the "maximum distance" parameter of the location API.

At step 410, alert module 103 checks the current location, e.g., by invoking an API that returns the current location. Then, based on the current location returned by the API, alert module 103 at step 420 determines the distance between the mobile device user's current location and the last location of the mobile device user stored in storage device 115. If the determined distance is greater than the "maximum distance" parameter (indicated as "max distance" in FIG. 4) (step 430, Yes), alert module 103 at step 440 stores the current location in storage device 115 and transmits the current location, along with a location alert, to alert management server 120.

Returning to step 430, if the determined distance is not greater than the "maximum distance" parameter (step 430, No), alert module 103 at step 450 determines the amount of time elapsed since the last location alert transmitted to alert management server 120. If the elapsed time is greater than the "maximum time" parameter of the location API (indicated as "max time" in FIG. 4) (step 460, yes), alert module 103 executes step 440. If the elapsed time is not greater than the "maximum time" parameter of the location API (step 460, no), the process ends.

In both examples of the method for generating location alerts, alert management server 120, upon receipt of the location alerts from mobile device 102, identifies which third party server should receive the location alert, based on the unique token, and transmits the location alert to the identified third party server. In the example illustrated herein, alert management server 120 transmits the location alert to third party server 101.

Furthermore, if OS 117 wakes up third party app 104 for any reason, alert module 103 checks to see if the elapsed time from the last location alert is greater than the "maximum" parameter of the location API. If so, alert module 103 determines a fresh location by invoking an API that returns the current location, and then applies one of rules above to determine if it should transmit a location alert to alert management server 120.

As will be appreciated based on the foregoing specification, the above-described embodiments of the disclosure may be implemented using computer programming or engineering techniques including computer software, firmware, hardware or any combination or subset thereof, wherein the technical effect includes providing location information in time- and location-based alerts. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the foregoing is directed to embodiments of the present invention, other and further embodiments of the invention may be devised without departing from the basic scope thereof, and the scope thereof is determined by the claims that follow.

We claim:

1. A mobile device, comprising:
   a storage device in which an application software of a third party service provider and rules associated with the application software are stored;
   a network interface;
   a sensor configured to detect a location of the mobile device; and
   a processor configured to generate a location alert to be transmitted through the network interface according to the rules, wherein
   the mobile device receives the rules from an alert management server and transmits the location alert to the alert management server even when the application software is not executing, and communicates with a server of the third party service provider during the execution of the application software.

2. The mobile device according to claim 1, wherein the rules are defined by the third party service provider and received through the network interface during installation of the application software in the mobile device.

3. The mobile device according to claim 2, wherein during installation of the application software in the mobile device, the processor generates a token that is unique to the mobile device and transmits the token to the alert management server.

4. The mobile device according to claim 2, wherein during installation of the application software in the mobile device, the processor receives a token that is unique to the mobile device from the alert management server.

5. The mobile device according to claim 1, wherein the processor is programmed to execute an operating system and an alert module of the operating system determines the location of the mobile device based on outputs from the sensor.

6. The mobile device according to claim 5, wherein the alert module generates the location alert according to the rules for transmission through the network interface.

7. The mobile device according to claim 6, wherein the rules define a geo-fence boundary, and the alert module generates the location alert when the mobile device travels across the geo-fence boundary.

8. The mobile device according to claim 6, wherein the rules define a maximum time, and the alert module generates the location alert when a time elapsed since a last location alert transmitted to the alert management server exceeds the maximum time.

9. The mobile device according to claim 6, wherein the rules define a maximum distance, and the alert module generates the location alert when a distance between the location of the mobile device and a location of the mobile device of a last location check exceeds the maximum distance.

10. A mobile device location monitoring system for a plurality of third party service providers including a first service provider, comprising:
    a mobile device in which an application software of the first service provider is installed, wherein the first service provider maintains an account that is accessible using the application software; and
    an alert management server that manages location monitoring rules for each of the third party service providers and transmits the location monitoring rules of the first service provider to the mobile device,
    wherein the mobile device is configured to generate a location alert to be transmitted to the alert management server according to the location monitoring rules of the first service provider and to access the account using the application software, and the alert management server is configured to notify the first service provider of the location alert.

11. The system according to claim 10, wherein the location monitoring rules of the first service provider are defined by the first service provider.

12. The system according to claim 11, wherein the mobile device receives the location monitoring rules from an alert management server and transmits the location alert to the alert management server independently of execution of the application software.

13. The system according to claim 11, wherein
during installation of the application software in the mobile device, the mobile device generates a token that is unique to the mobile device and transmits the token to the alert management server.

14. The system according to claim 11, wherein
during installation of the application software in the mobile device, the mobile device receives a token that is unique to the mobile device from the alert management server.

15. The system according to claim 10, wherein
the mobile device includes a sensor and is programmed with an operating system, and an alert module of the operating system determines the location of the mobile device based on outputs from the sensor.

16. The system according to claim 15, wherein the alert module generates the location alert according to the location monitoring rules of the first service provider.

17. The system according to claim 16, wherein
the location monitoring rules of the first service provider define a geo-fence boundary, and
the alert module generates the location alert when the mobile device travels across the geo-fence boundary.

18. The system according to claim 16, wherein
the location monitoring rules of the first service provider define a maximum time, and
the alert module generates the location alert when a time elapsed since a last location alert transmitted to the alert management server exceeds the maximum time.

19. The system according to claim 16, wherein
the location monitoring rules of the first service provider define a maximum distance, and
the alert module generates the location alert when a distance between the location of the mobile device and a location of the mobile device of a last location check exceeds the maximum distance.

20. The system according to claim 13, wherein the token is a unique alphanumeric token specific to a current instance of the application software of the first service provider installed on the mobile device.

* * * * *